United States Patent [19]  
Hayden et al.

[11] 4,072,623  
[45] Feb. 7, 1978

[54] POLYURETHANE FOAM SYSTEM

[75] Inventors: David E. Hayden; Millard E. Foucht, both of Newark, Ohio

[73] Assignee: Owens-Corning Fiberglas Corporation, Toldeo, Ohio

[21] Appl. No.: 636,321

[22] Filed: Nov. 28, 1975

[51] Int. Cl.$^2$ .................... C08G 18/32; C08G 18/12
[52] U.S. Cl. ................... 252/182; 260/2.5 Am; 260/2.5 AQ; 260/2.5 BG; 260/77.5 AM; 260/77.5 AQ
[58] Field of Search .............. 252/182; 260/2.5 AM, 260/2.5 AQ, 77.5 AM, 77.5 AO, 2.5 BG

[56] References Cited  
U.S. PATENT DOCUMENTS

| | | | |
|---|---|---|---|
| 3,833,526 | 9/1974 | Cear et al. | 252/182 |
| 3,890,255 | 6/1975 | Van Leuwen et al. | 260/77.5 AM |
| 3,993,576 | 11/1976 | Barron | 252/182 |

Primary Examiner—Benjamin R. Padgett  
Assistant Examiner—Irwin Gluck  
Attorney, Agent, or Firm—Patrick P. Pacella; Philip R. Cloutier; Dennis M. Kozak

[57] ABSTRACT

We disclose a combination of three polyols. Polyurethane foams formed by reacting these polyols with an isocyanate exhibit good foam-substrate adhesion and good foam surface properties. This combination of polyols performs especially well in spray applications and is ideally suited for use in cold weather.

9 Claims, No Drawings

POLYURETHANE FOAM SYSTEM

Our invention relates to polyurethane foams.

More specifically, our invention relates to a combination of three polyols that can be employed in polyurethane foams, which foams can be spray-applied to various substrates in cold weather.

It is well known that rigid polyurethane foams can be applied to substrates by spraying-in-place using one of two methods. The rigid polyurethane foams can be spray-applied as a liquid which liquid foams rapidly and sets, or it can be applied as a frothed foam with discrete particles which expand to the final foam density before setting.

The commercial success of polyurethane spray foams is due to their ability to cover surfaces which would be impractical to cover with either poured-in-place or slab foam.

One factor limiting the commercial utilization of polyurethane spray foams has been the difficulty in achieving good foam-substrate adhesion and good foam surface properties when the foams are applied to substrates at temperatures below 60° F. The substrates generally are materials such as metal, wood, brick, concrete or other masonry products.

Our invention helps to improve the commercial usefulness of polyurethane spray foams by providing a combination of three polyols, wherein the resulting foam exhibits excellent foam-substrate adhesion and foam surface properties when spray-applied on substrates having temperatures within the range of from about 20° F to about 60° F.

The polyurethane spray foams of our invention include at least three polyols.

One polyol, the "first polyol," is an oxyalkylated Mannich reaction product of a phenol, an aldehyde and an alkanol amine, reacted to a hydroxyl number within the range of from about 350 to about 650.

One polyol, the "second polyol," is an oxyalkylated polyamine reacted to a hydroxyl number within the range of from about 600 to about 800.

One polyol, the "third polyol," is pentaerythritol oxyalkylated to a hydroxyl number within the range of from about 350 to about 650.

The polyol combination comprising the three polyols set out above can be employed in any polyurethane foam. Preferably, the polyol combination will be employed in a rigid polyurethane spray system comprising an isocyanate, a first blowing agent, a surfactant, a crosslinking agent, a first catalyst and a second catalyst.

The "first polyol," which as stated previously is an oxyalkylated Mannich reaction product, will comprise from about 7.5 to about 17.5 parts per 100 parts by weight of the total polyurethane foam. In the production of the "first polyol," the Mannich reaction product is to be selected from the group represented by the general formula:

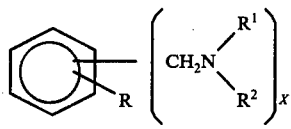

wherein R is H or an alkyl radical containing from 1 to 20 carbon atoms, $R^1$ is a hydroxyalkyl radical containing from 1 to 5 carbon atoms; and $R^2$ is H, an alkyl radical containing from 1 to 5 carbon atoms or a hydroxyalkyl radical containing from 1 to 5 carbon atoms and X is an integer having a value of 1 or 2.

In order to obtain a "first polyol" of our invention, the above-described Mannich reaction product is reacted with a vicinal alkylene oxide, containing from 2 to 4 carbon atoms to a hydroxyl number of from about 350 to about 650.

A particularly suitable "first polyol" is designated Thanol R-650-X, commercially available from Jefferson Chemical Co. Inc., Houston, Texas. Thanol R-650-X is an oxyalkylated Mannich reaction product of phenol, formaldehyde and diethanol amine and has a hydroxyl number within the range of from about 440 to about 460.

The "second polyol," which as stated previously is an oxyalkylated polyamine, will comprise from about 3.5 to about 9 parts per 100 parts by weight of the total polyurethane system. In the production of the "second polyol," the polyamine can be any aliphatic, alicyclic or branched chained polyamine containing from 2 to 6 carbon atoms and represented by the general formulae:

(a) $R^3 - (NH_2)_2$            (a)

wherein $R^3$ is an aliphatic, alicyclic or branched chained hydrocarbon containing from 2 to 6 carbon atoms;

$$H_2NR^4(NHR^5)_xNH_2 \qquad (b)$$

wherein $R^4$ and $R^5$ are each selected from the group consisting of an aliphatic, alicyclic or branched chained hydrocarbon containing from 2 to 4 carbon atoms such that the total number of carbon atoms is 4 to 6, and X is the integer 1 or 2;

$$R^6(NHR^7)_xNH_2 \qquad (c)$$

wherein $R^6$ is an aliphatic, alicyclic or branched chained hydrocarbon containing from 1 to 4 carbon atoms, $R^7$ is an aliphatic, alicyclic or branched chained hydrocarbon containing from 2 to 4 carbon atoms, and the total number of carbon atoms is 3 to 6, and X is the integer 1 or 2.

In order to obtain a "second polyol" of our invention, an above-described polyamine is reacted to a hydroxyl number of from about 600 to about 800 with a vicinal alkylene oxide containing from 2 to 4 carbon atoms.

A particularly suitable "second polyol" is designated Niax LA 700, commercially available from Union Carbide Corp., New York, New York.

Niax LA 700 is the oxyalkylated reaction product of about 1 mole of diethylenetriamine with about 5 moles of propylene oxide.

The "third polyol," which as stated previously is oxyalkylated pentaerythritol, comprises from about 7.5 to about 17.5 parts per 100 parts by weight of the total polyurethane foam. In the production of the "third polyol," the pentaerythritol is oxyalkylated to a hydroxyl number within the range of from about 350 to about 650 and is represented by the following formula:

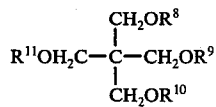

wherein $R^8$, $R^9$, $R^{10}$ and $R^{11}$ each represent the radical

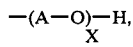

in which A is the alkylene residue of a vicinal alkylene oxide containing from 2 to 4 carbon atoms and X is an integer of from 0 to 3.

A particularly suitable "third polyol" is designated Pluracol PeP 550, commercially available from BASF Wyandotte Corp., Wyandotte, Michigan.

Pluracol PeP 550 is the oxyalkylated reaction product of about 1 mole of pentaerythritol with about 6 moles of propylene oxide.

In the production of our polyurethane foams, any suitable isocyanate or reactive —NCO containing compound can be employed. The isocyanate will comprise from about 42.5 to about 48.5 parts per 100 parts by weight of the polyurethane foam.

Suitable isocyanates or reactive —NCO containing compounds which can be employed in practicing this invention include 2,4-tolylene diisocyanate; 2,6-tolylene diisocyanate; p-phenylene diisocyanate; polymethylene polyphenylisocyanate; diphenyl-methane diisocyanate; m-phenylene diisocyanate; hexamethylene diisocyanate; butylene-1,4-diisocyanate; octamethylene diisocyanate; 3,3'-dimethoxy-4,4'-biphenylene diisocyanate; 1,18-octadecamethylene diisocyanate; polymethylene diisocyanate; benzene triisocyanate; naphthylene-2,4-diisocyanate; 3,3'-dimethyl-4,4'-biphenylene diisocyanate; 1-methoxy phenylene-2,4-diisocyanate; diphenylene-4,4'-diisocyanate; 4,4'-diisocyanate diphenyl ether; naphthylene-1,5-diisocyanate; diisocyanate-dicyclohexyl-methane; p-xylylene diisocyanate; xylylene diisocyanate; hydrogenated diphenylene diisocyanate; hydrogenated diphenyl methane diisocyanate; toluene-2,4,6-triisocyanate; 3,-methyl-4,6,4'-triisocyanate diphenyl methane; 2,4,4'-triisocyanate diphenyl; 2,4,4'-triisocyanate diphenyl ether; long chain hydrocarbons and substituted hydrocarbons terminated with —NCO radicals and mixtures thereof. Prepolymers having reactive isocyanate or —NCO groups can also be employed.

A particularly suitable isocyanate is designated Mondur MR, commercially available from Mobay Chemical Co., Pittsburgh, Pennsylvania.

Mondur MR is a polymeric polyaryl-polyisocyanate prepared by phosgenation of aniline and formaldehyde in a mineral acid, the polyisocyanate having from about 31.5 to about 32% active —NCO groups and a viscosity of about 200 cps. at 25° C.

In our polyurethane foam, any blowing agent commonly used in the art can be employed as the first blowing agent. The blowing agent will comprise from about 7.5 to about 17.5 parts per 100 parts by weight of the polyurethane foam.

Suitable first blowing agents include the fluorochlorocarbons which boil in the range of from about 20° to about 50° C, for example, trichlorofluoromethane, trichlorofluoroethane, dichloromonofluoromethane, monochloroethane, monochloromonofluoroethane, difluoromonochloroethane, difluorodichloroethane and mixtures thereof. A particularly suitable first blowing agent is designated Freon 11B, commercially available from E. I. du Pont de Nemours & Co., Wilmington, Delaware.

When spraying substrates having temperatures below 50° F, a second blowing agent is required in order to achieve an adequate product yield and good foam properties. The second blowing agent, if employed, will be present in an amount within the range of from about 1 to about 6 parts by weight per 100 parts by weight of the total polyurethane foam and is commonly introduced into the polyurethane foam by direct injection into the spray equipment from a pressurized storage tank. A particularly suitable second blowing agent is dichlorodifluoromethane, commercially designated Freon 12, available from E. I. du Pont de Nemours & Co., Wilmington, Delaware.

Any suitable surfactant can be employed in our polyurethane composition. The surfactant will comprise from about 0.1 to about 1 part per 100 parts by weight of the polyurethane foam. A particularly suitable surfactant is designated DC 193 Surfactant, commercially available from Dow Corning Corp., Midland, Michigan. DC 193 Surfactant is a combination of dimethyl silicone with an adduct of ethylene oxide and propylene oxide where the adduct is hydroxyl terminated.

Suitable crosslinking agents include most low viscosity, high hydroxyl number materials. A particularly useful crosslinking agent is ethylene glycol. The crosslinking agent will comprise from about 0.5 to about 4 parts per 100 parts by weight of the polyurethane foam.

Any suitable first catalyst can be employed. The first catalyst will comprise from about 0.3 to about 2.5 parts per 100 parts by weight of the polyurethane foam. A particularly suitable first catalyst is designated Dabco R8020, commercially available from the Houdry Division of Air Products and Chemicals, Inc., Philadelphia, Pennsylvania. Dabco R8020 is a 20% triethylenediamine, 80% dimethylethanolamine solution.

Any suitable second catalyst can be employed. The second catalyst will comprise from about .05 to about 0.5 parts per 100 parts by weight of the polyurethane foam. Suitable second catalysts include organo-tin compounds. A particularly suitable organo-tin compound is designated Carstan T-52N, commercially available from Cincinnati Milacron Chemicals Inc., Reading, Ohio. Carstan T-52N is dibutyl tin bis isooctyl maleate.

In addition, suitable flame retardants can be employed. If employed, the total amount of flame retardant will comprise from about 3 to about 12 parts per 100 parts by weight of the polyurethane foam. Particularly suitable flame retardants are Stauffer Fyrol 32B and Stauffer Fyrol CEF, both commercially available from Stauffer Chemical Co., located in New York, New York. Fyrol 32B is tris 2,3-dibromopropyl phosphate and Fyrol CEF is tris 2-chloroethyl phosphate.

The rigid polyurethane foams which are concerned in the subject invention have an —NCO/—OH index greater than 1/1, preferably from about 1/1 to about 5/4, and can be applied in the usual manner of applying any polyurethane spray foam. A conventional method of applying polyurethane spray foams is by spray-in-place application onto substrate surfaces prepared in the usual manner to accept paint. When applied to substrates at temperatures between 20° F to 60° F, the rigid polyurethane foams of this invention exhibit good foam-substrate adhesion and good foam surface properties.

The following examples illustrate the preparation of rigid polyurethane foams of our invention.

EXAMPLE I

This example demonstrates the best mode of preparing a polyurethane spray foam of our invention.

| Ingredients | Parts per 100 Parts By Weight |
|---|---|
| "A" Component | |
| Mondur Mr | 47.0 |
| Fyrol 32B | 3.0 |
| | 50.0 |
| "B" Component | |
| Niax LA 700 | 6.0 |
| Pluracol PeP 550 | 12.7 |
| Thanol R-650-X | 13.0 |
| DC 193 Surfactant | 0.4 |
| Dabco R8020 | 0.3 |
| Carstan T-52N | 0.3 |
| Ryfol CEF | 2.5 |
| ethylene glycol | 1.5 |
| Freon 11B | 13.3 |
| | 50.0 |

Each component was mixed separately.

"A" Component was prepared as follows. The total quantity of Mondur MR and the total quantity of Fyrol 32B were added to a reactor and stirred until completely mixed, about 30 minutes. The resulting product, a dark brown colored liquid, was recovered as the "A" Component.

The "B" Component was prepared as follows. The total quantity of Pluracol PeP 550 was added to the reactor with agitation, the total quantities of Thanol R-650-X, Niax LA 700, ethylene glycol, Fyrol CEF and DC 193 Surfactant were added and mixed for about 20 minutes. The Freon 11B was then added with slow agitation in order to minimize the Freon boil-off. Next, the total quantities of the Dabco R8020 and the Carstan T-52N were added with continued agitation over a period of about 30 minutes, during which period frequent additions of the Freon lost in boil-off were made. The resulting product, a tan colored liquid, was recovered as the "B" Component.

EXAMPLE II

This example demonstrates the preparation of a polyurethane spray foam which can be applied to substrates having temperatures below 40° F.

The same ingredients, amounts of ingredients and mixing procedure were used as in Example I. In addition, 4 parts of Freon 12 per 100 parts by weight of the total polyurethane foam were added by direct injection from a pressurized tank into the spray equipment.

EXAMPLE III

The polyurethane spray foams of Examples I and II were each separately spray-applied in an "A" Component/"B" Component application ratio of 1:1 to an epoxy primed steel substrate having a temperature of about 40° F. The following table indicates the average property levels obtained by each Example.

| Property | ASTM Test | Example I | Example II |
|---|---|---|---|
| Density (lb/ft) | D 1622-63 | 2.48 | 2.23 |
| Compressive Strength: | D 1621-73 | | |
| Parallel (psi) | | 37.1 | 28 |
| Lengthwise (psi) | | 20.1 | 19 |
| Widthwise (psi) | | 20.7 | — |
| Thermal Conductivity: | C 518-70 | | |
| As Manufactured | | | |
| (Btu in/hr ft deg F) | | 0.12 | 0.12 |
| Aged (3 mos. at 140° F) | | | |
| (Btu in/hr ft deg F) | | 0.16 | 0.16 |
| Surface Burning Characteristics 1" thick, self-supported: | E 84-70 | | |
| Flame Spread | | 42 | 23 |
| Fuel Contributed | | 0 | 0 |
| Smoke Developed | | 268 | 160 |
| Foam-Substrate Adhesion (psi) | D 1623-72* | 25 | 25 |

*D 1623-72 is the ASTM test method for tensile strength. In order to measure substrate adhesion we modified D 1623-72 slightly by spraying the foam onto an epoxy primed steel substrate surface and measured the force required to pull the foam away from the substrate surface.

As shown by the above table, both examples exhibit excellent foam-substrate adhesion and maintained acceptable levels of all other properties.

In addition to the excellent substrate adhesion, each foam was visually inspected and found to possess very few pinholes, thus resulting in foams with good surface properties.

It will be evident from the foregoing that various modifications can be made to our invention. Such, however, are considered as being within the scope of this invention.

We claim:

1. A polyol composition comprising at least a first, a second and a third polyol wherein,
   a. said first polyol is an oxyalkylated Mannich reaction product of a phenol, an aldehyde and an alkanol amine, reacted to a hydroxyl number within the range of from about 350 to about 650;
   b. said second polyol is an oxyalkylated polyamine reacted to a hydroxyl number within the range of from about 600 to about 800; and
   c. said third polyol is pentaerythritol oxyalkylated to a hydroxyl number within the range of from about 350 to about 650.

2. The polyol composition of claim 1 wherein said first polyol is a Mannich reaction product selected from the group represented by the general formula

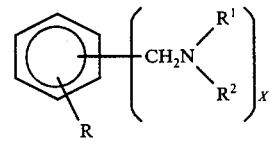

wherein R is H or an alkyl radical containing from 1 to 20 carbon atoms, $R^1$ is a hydroxyalkyl radical containing from 1 to 5 carbon atoms, $R^2$ is H, an alkyl radical containing from 1 to 5 carbon atoms or a hydroxyalkyl radical containing from 1 to 5 carbon atoms, reacted with a vicinal alkylene oxide containing from 2 to 4 carbon atoms, and $x$ is an integer having a value of 1 or 2.

3. The polyol composition of claim 1 wherein said first polyol is present in an amount within the range of about 17 to about 40 parts per 100 parts by weight of said polyol composition.

4. The polyol composition of claim 1 wherein said second polyol is an aliphatic, alicyclic or branched chained polyamine containing from 2 to 6 carbon atoms reacted with a vicinal alkylene oxide containing from 2 to 4 carbon atoms.

5. The polyol composition of claim 4 wherein said polyamine is selected from polyamines represented by the general formulae:

$$R^3 - (NH_2)_2 \qquad (a)$$

wherein R³ is an aliphatic, alicyclic or branched chained hydrocarbon containing from 2 to 6 carbon atoms;

$$H_2NR^4(NHR^5)_xNH_2 \quad (b)$$

wherein $R^4$ and $R^5$ are each selected from the group consisting of aliphatic, alicyclic or branched chained hydrocarbon containing from 2 to 4 carbon atoms such that the total number of carbon atoms is 4 to 6, and X is the integer 1 or 2;

$$R^6(NHR^7)_xNH_2 \quad (c)$$

wherein $R^6$ is an aliphatic, alicyclic or branched chained hydrocarbon containing from 1 to 4 carbon atoms, $R^7$ is an aliphatic, alicyclic or branched chained hydrocarbon containing from 2 to 4 carbon atoms, and the total number of carbon atoms of $R^6$ and $R^7$ is 3 to 6, and X is the integer 1 or 2.

6. The polyol composition of claim 1 wherein said second polyol is present in an amount within the range of about 8 to about 20 parts per 100 parts by weight of said polyol composition.

7. The polyol composition of claim 1 wherein said third polyol is represented by the following formula

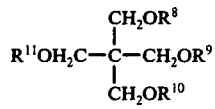

wherein $R^8$, $R^9$, $R^{10}$ and $R^{11}$ each represent the radical $-(A-O)_x-H$, in which A is the alkylene residue of a vicinal alkylene oxide containing from 2 to 4 carbon atoms and X is an integer of from 0 to 3.

8. The polyol composition of claim 1 wherein said third polyol is present in an amount within the range of about 17 to about 40 parts per 100 parts by weight of said polyol composition.

9. The polyol composition of claim 1 wherein said first polyol is an oxyalkylated Mannich reaction product of phenol, formaldehyde and diethanol amine and has a hydroxyl number within the range of from about 440 to about 460, said second polyol is the oxyalkylated reaction product of about 1 mole of diethylenetriamine with about 5 moles of propylene oxide and, said third polyol is the oxyalkylated reaction product of about 1 mole of pentaerythritol and about 6 moles of propylene oxide.

* * * * *